Sept. 10, 1968      E. W. BERGERE      3,400,626
TWELVE-LOBE FASTENER
Filed March 13, 1967
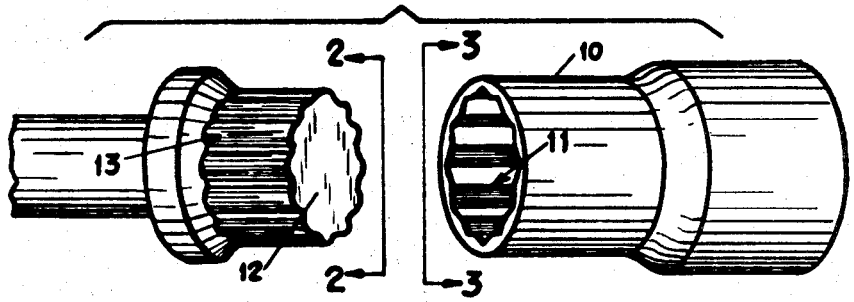
FIG. 1
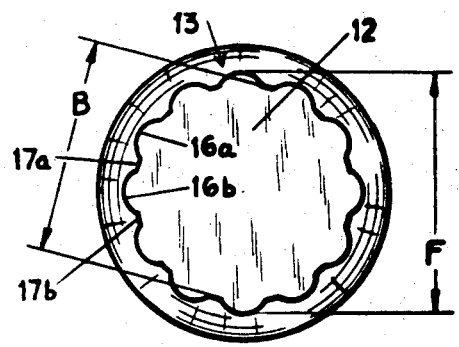
FIG. 2
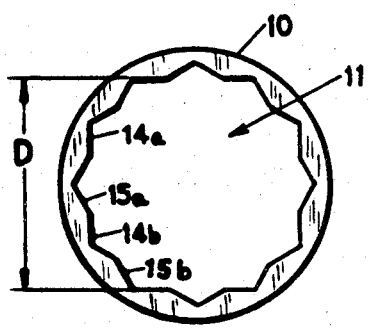
FIG. 3
GIVEN D
$.08D \leq G \leq .08D + .004$
$F = D \cdot \sec 30° - 2G(\sec 30° - 1)$
$B = \dfrac{D}{2}(1 + \sec 15°)$
FIG. 5
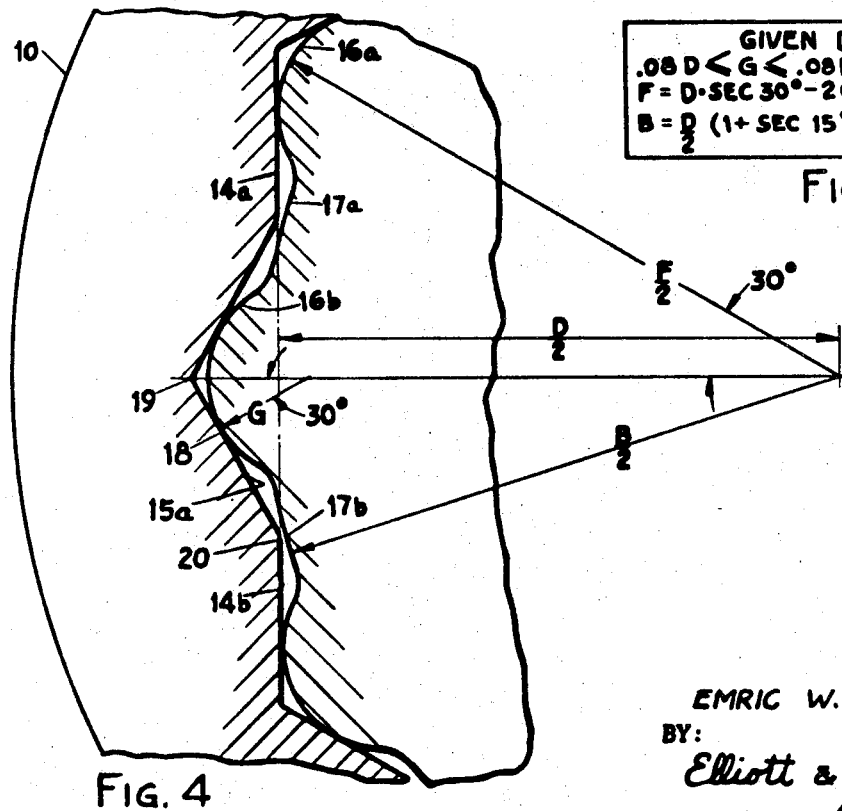
FIG. 4
INVENTOR:
EMRIC W. BERGERE
BY:
*Elliott & Pastoriza*
ATTORNEYS United States Patent Office 3,400,626
Patented Sept. 10, 1968

3,400,626
TWELVE-LOBE FASTENER
Emric W. Bergere, 2324 Nottingham Ave.,
Los Angeles, Calif. 90027
Continuation-in-part of application Ser. No. 450,870,
Apr. 26, 1965. This application Mar. 13, 1967, Ser.
No. 622,798
1 Claim. (Cl. 85—9)

ABSTRACT OF THE DISCLOSURE

Fastening devices either in the form of threaded bolts or threaded nuts having a specialized exterior wrenching contour for engagement by the recesses of a standard double hexagon wrenching tool socket of mating size. The wrenching contour of the fastener is such that the standard wrenching tool sockets can be used and yet a considerably higher torque can be applied before failure of the socket. The actual wrenching contour is defined by twelve lobes circumferentially spaced about the fastening device, each lobe constituting part of a semicircle, there being defined valleys between the lobes. If D represents the distance between diametrically opposite flats of one of the double hexagons defining the standard socket within a standard tolerance, G the radius of curvature of each lobe, F the diameter of the contour measured from the tips of diametrically opposite lobes, and B the diameter of the contour measured from diametrically opposite valleys between the lobes, then the values of G, F, and B in terms of the dimension D of the wrenching socket are given by the formulas set forth in FIGURE 5.

This application is a continuation-in-part of my copending application Ser. No. 450,870 filed Apr. 26, 1965 and entitled Twelve-Lobe Fastener, now abandoned.

This invention relates generally to fastening devices and more particularly to a novel wrenching contour for a fastening device such as a bolt or nut.

Conventional bolts and nuts of the type used in military aircraft and missiles must be torqued to high tensile preloads to resist reversal stress. Conventionally, these fasteners are provided with a twelve point double hexagon wrenching contour for operation with standard wrenching sockets, such as set forth in Federal Specification GGG-W-641. It is found that in applying torque loads to these bolts or nuts, to unfasten the same, the twelve point wrenching surfaces become eroded so that the joint cannot be taken apart. In addition, hoop tension in the socket tool when it rotates about an eroded nut or bolt contour can crack the socket.

The reason for the foregoing difficulties is that in wrenching the bolt or nut of conventional twelve point double hexagon contour with the standard type of wrenching tool socket generally results in two or three points of the recesses of the socket making contact with the points on the fastening contour rather than all twelve recesses and points respectively contacting each other. This relatively small number of point contacts is a consequence of the double hexagon configuration of the sockets and fasteners and the tolerances permitted in the manufacture of the sockets and the fasteners themselves. In the mechanical process of applying a high fastening or unfastening torque with the conventional standard socket and conventional contoured wrenching surface of the fastener, the load is so great at the two or three contact points initially made that the points slide and are eroded so that the socket will skip around until perhaps two or three other point contacts are made. These small number of contact points results again in a large load on each contact point which again can cause the undesired erosion. When all of the points are eroded, the sliding action of the eroded points on the double hexagon shaped recesses of the socket can so increase the hoop tension as to crack the socket itself.

While torque loads may be increased by providing specially designed wrenching contours for the wrenching tool socket and corresponding contours for the fastener such as a bolt or nut, there would be required the provision of revised specifications for both fasteners and wrenching socket tools. As a practical matter, it therefore becomes desirable to provide a modified wrenching contour for the fastener itself which will fit all standard wrenching sockets as presently set forth in Federal Specifications.

With the foregoing considerations in mind, it is a primary object of this invention to provide a novel wrenching contour for a fastener which will enable a much higher torque to be applied for effecting a fastening or unfastening operation with a standard specified socket without the risk of eroding the wrenching contour of the fastener of cracking the socket itself all to the end that standard wrenching tools presently in use may be employed with the improved wrenching contour.

More particularly, it is an object to provide a novel wrenching contour for a fastener for cooperation with a standard double hexagon type wrenching tool socket wherein twelve-point contact is effected as a consequence of the wrenching contour configuration so that the torque load is distributed at twelve points rather than only a few points with the attendant advantage of a much higher torque capability before failure.

Still another object is to provide an improved wrenching contour for a fastener wherein hoop tension created in the standard wrenching socket tool employed to apply torque to the fastener is considerably less for a given torque than is the case with presently known wrenching surfaces.

Briefly, these and other objects and advantages of this invention are attained by providing a wrenching contour on a fastener for engagement by the recesses of a standard double hexagon wrenching tool socket of mating size, the wrenching contour having twelve lobes each defined by part of a semicircle and equally circumferentially spaced about the fastening device. The radius of curvature of each of the lobes in relation to the diameter of the entire contour as measured from the tips of diametrically opposite lobes and the diameter of the contour measured from diametrically opposite valleys between the lobes are all interrelated and dependent upon the size of the wrenching tool socket as measured between flats of one of the double hexagons defining the socket. The relationships have been determined such as to effect a twelve-point contact of the lobes by the recesses of the socket driving tool after a certain torque has been applied to the end that the various advantages of decreased hoop tension and greater torqueing ability result.

A better understanding of the invention will be had by referring to one embodiment thereof as illustrated in the accompanying drawings, in which:

FIGURE 1 is a perspective view illustrating a portion of a standard driving tool socket for cooperation with a fastening device shown separated from the socket having the novel wrenching contour of this invention;

FIGURE 2 is an end view of the fastening device taken in the direction of the arrows 2—2 of FIGURE 1;

FIGURE 3 is an end view of the standard socket taken in the direction of the arrows 3—3 of FIGURE 1;

FIGURE 4 is a greatly enlarged fragmentary view of a portion of the wrenching contour of the fastener engaged by a portion of the wrenching socket; and, FIGURE 5 is a table setting forth certain relationships between various dimensions designated in FIGURES 2, 3, and 4.

Referring first to FIGURE 1, there is shown a standard wrenching tool 10 provided with a socket 11 having recesses defined by a double hexagon configuration. This tool is normally employed for driving fasteners such as bolts or nuts provided with a corresponding double hexagon wrenching contour surface. In such instances, as described heretofore, proper twelve-point contact is not always effected with the result of erosion of the points and consequent failure of the socket when given torques are exceeded.

In accord with the present invention, a fastener such as a nut or bolt illustrated at 12 in FIGURE 1 is provided with a novel wrenching contour designated generally by the numeral 13.

As seen best in FIGURE 2, the contour includes twelve lobes each defined in part by a semicircle and each being equally circumferentially spaced about the fastener 12. This contour has a diameter as measured between the tips of diameterically oposite lobes designated F. The diameter of the contour as measured between diametrically opposite valleys between the lobes is indicated at B.

With reference now to the standard wrenching socket as shown in FIGURE 3, the dimension or distance between opposite flats of one of the double hexagons defining the recesses is designated D. This dimension is conventionally employed to designate the size of the wrenching tool.

FIGURE 4 illustrated the manner in which the socket engages the wrenching contour of the fastener. For example, the recessed flat portion 14a is defined by one flat portion of one hexagon and the remaining portion of this flat being designated 14b and connected to the flat 14a by the dot-dashed line. The dimension D described in FIGURE 3 may be used to designated the distance from this flat to the center or axis of the socket the dimension in FIGURE 4 being equal to D/2. The corresponding flats for the other of the two hexagons are shown at 15a and 15b in FIGURE 3.

The flat 14a is shown engaging a specific lobe 16a in FIGURE 4 and the flat 15a is shown engaging a lobe 16b. Lines drawn from the extreme trips of the lobes 16a and 16b to the center axis form an angle of 30° as indicated in FIGURE 4 for the twelve-lobe contour.

The radius of curvature of each of the lobes is of equal value and is designated G for the particular lobe 16b. This radius of curvature has a value such that there are defined finite valleys between the lobes as indicated at 17a between the lobes 16a and 16b and 17b following the lobe 16b and the next successive lobe. The radial distance of these valley from the central axis of the fastening device is designated B/2 where B constitutes the diametric dimension between the valleys as described in FIGURE 2. In a similar manner, the radial distance of the tips of the lobes to the center of the device is shown at F/2 where F is as defined in FIGURE 2.

The values for G, F and B will be determined by the given dimension D of the particular wrenching socket employed. Thus, once a selected standard wrenching socket is provided, the configuration of the novel wrenching contour for the fastener is determined. In this respect, the various relationships for determining the correct values are given in the table of FIGURE 5.

As shown in FIGURE 5, and as explained above, the dimension D is given in that it is determined by the flat to flat dimension of the standard socket wrenching tool. The radius of curvature G for each of the lobes is then defined as having a minimum value of .08D where D is in inches. The maximum tolerance allowed in the provision of the radius of curvature dimension G is .004" and thus G may have values as indicated in the table of FIGURE 5.

It should be understood that the dimension D itself will have values within standard tolerances and thus there can exist a D minimum condition and a D maximum condition which will also affect the value of G.

The dimension F or tip or tip diametric measurement of the novel contouring of this invention is then given by the formula illustrated in FIGURE 5, that is:

$$F = D \cdot \sec 30° - 2G(\sec 30° - 1)$$

the dimension B in turn is given by the formula as shown in FIGURE 5:

$$B = \frac{D}{2}(1 + \sec 15°)$$

There will actually be minimum and maximum tolerable values for F and B depending upon the exact values of D and G within their tolerances.

Specific examples for various standard sized wrenching sockets are given in the following table, all figures being in inches:

| Nom. size | D_min. | D_max. | G_min. | G_max. | F_min. | F_max. | B_min. | B_max. |
|---|---|---|---|---|---|---|---|---|
| 5/16" | .316 | .322 | .025 | .029 | .351 | .354 | .323 | .327 |
| 3/8" | .378 | .384 | .030 | .034 | .421 | .424 | .387 | .391 |
| 1/2" | .504 | .510 | .040 | .044 | .564 | .567 | .518 | .522 |
| 5/8" | .629 | .636 | .050 | .054 | .712 | .716 | .647 | .653 |

For the specific example of the one-half inch tool socket it was found that with the old type of fastener contour constituting a double hexagon structure, failure occurred under a torque of 2800 inch-pounds. With the same standard one-half inch socket applied to the novel wrenching contour of the present invention, 4000 inch-pounds of torque were applied without any failure.

Referring once again to the enlarged fragmentary view of FIGURE 4, the actual operation taking place under wrenching torque will be described. With specific reference, for example, to the lobe 16b, it will be noted that for a clockwise rotation of the socket, the lobe will bear against the recess flat 15a at the point 18. Because of the shape of the lobe as constituting part of a semi-circle of a given radius of curvature G, this point or line engagement results in a slight brinelling rather than sliding action of the engaged surfaces. In other words, the circular shape permits a slight burying of the lobe into the recess so that all of the lobes will make contact as a consequence of this action after a given torque has been applied. This action is contrary to that occurring in the event a standard double hexagon type contouring for the fastener were employed. In this latter instance, there would not be a point or line contact with the recess flat 15a but rather a planar contact with the result that should only two or three points engage, there would not be the yelding necessary to effect twelve-point engagement. As a consequence, the contacting portions of the conventional type of double hexagon contour would have to bear the entire torque and the heretofore described erosion will take place. In addition, a sliding action occurs tending to bring the actual engagement away from the vertex point 19 and towards the socket apex point 20.

The further away engagement of the recess flat 15a from the apex 19 occurs, the greater will be the stress as at the apex point 19 and it is at this point where cracking occurs in the conventional standard driving sockets when driving conventional double hexagon fastener wrenching contours with too much torque.

When the lobe contour is employed as illustrated in FIGURE 4, there not only results the advantage of twelve-point contact for the reasons set forth, but in addition, the contact points themselves such as at 18 are considerably closer to the apex 19 and thus the reaction forces do not result in as great a stress at the point 19. Further, because of the twelve-point contact, the actual forces involved at each point of contact are considerably less than is the case when only a few points are contacted as characterizes the situation with prior art fasteners torqued with standard sockets as described.

The radius of curvature of the lobes designated G is fairly critical as indicated by the table in FIGURE 5. If the radius of curvature is too large, the desirable feature of line point contact when viewed as in FIGURE 4 is lost and the engagement of all twelve points will not take place until a considerably higher torque is applied. On the other hand, if the radius is too small, there cannot be provided a contact point sufficiently close to the apex 19 to avoid undue stressing at this apex point. The optimum value of this radius of curvature is indicated in FIGURE 4 wherein if a normal is drawn to the contact point 18, it coincides with the radius of curvature and forms an angle of 30° with respect to the horizontal line passing from the center through the apex 19.

From the foregoing description, it will thus be evident that the present invention has provided a novel wrenching contour for a fastening device wherein the various objects set forth heretofore are fully realized.

What is claimed is:

1. A fastening device having a wrenching contour for engagement by the recesses of a standard double hexagon wrenching tool socket of mating size D, where D is the distance between diametrically opposite flats of one of the double hexagons defining said socket within a standard tolerance, said wrenching contour having twelve lobes each defined by part of a semicircle, and each equally circumferentially spaced about said device, and in which, if G is the radius of curvature of each of said lobes, F the diameter of said contour measured from the tips of diametrically opposite lobes, and B the diameter of said contour measured from diametrically opposite valleys between the lobes, then G, F, and B are defined as follows:

$$.08\ D \leqslant G \leqslant .08D + .004''$$

where D is given in inches;

$$F = D \cdot \sec. 30° - 2G(\sec. 30° - 1)$$

and $$B = \frac{D}{2}(1 + \sec. 15°)$$

where F can assume minimum and maximum values within the tolerances for D and G, and where B can assume minimum and maximum values within the tolerances of D, whereby wrenching of said contour by said tool results in twelve point engagement of said lobes with said socket after a given torque has been exceeded to thereby enable a higher torque to be applied before failure of said socket than in the case of a contour of the standard double hexagon form for said fastening device.

References Cited

UNITED STATES PATENTS

| | | | |
|---|---|---|---|
| 2,083,092 | 6/1937 | Richer | 85—45 |
| 2,895,368 | 7/1959 | Place | 85—9 |
| 2,969,250 | 1/1961 | Kull | 85—45 |
| 3,140,636 | 7/1964 | Grimm | 85—32 |
| 3,290,982 | 12/1966 | Marschner | 85—1 |

FOREIGN PATENTS

| | | |
|---|---|---|
| 1,273,228 | 8/1961 | France. |

CARL W. TOMLIN, *Primary Examiner.*

RAMON S. BRITTS, *Assistant Examiner.*